Patented Aug. 2, 1932

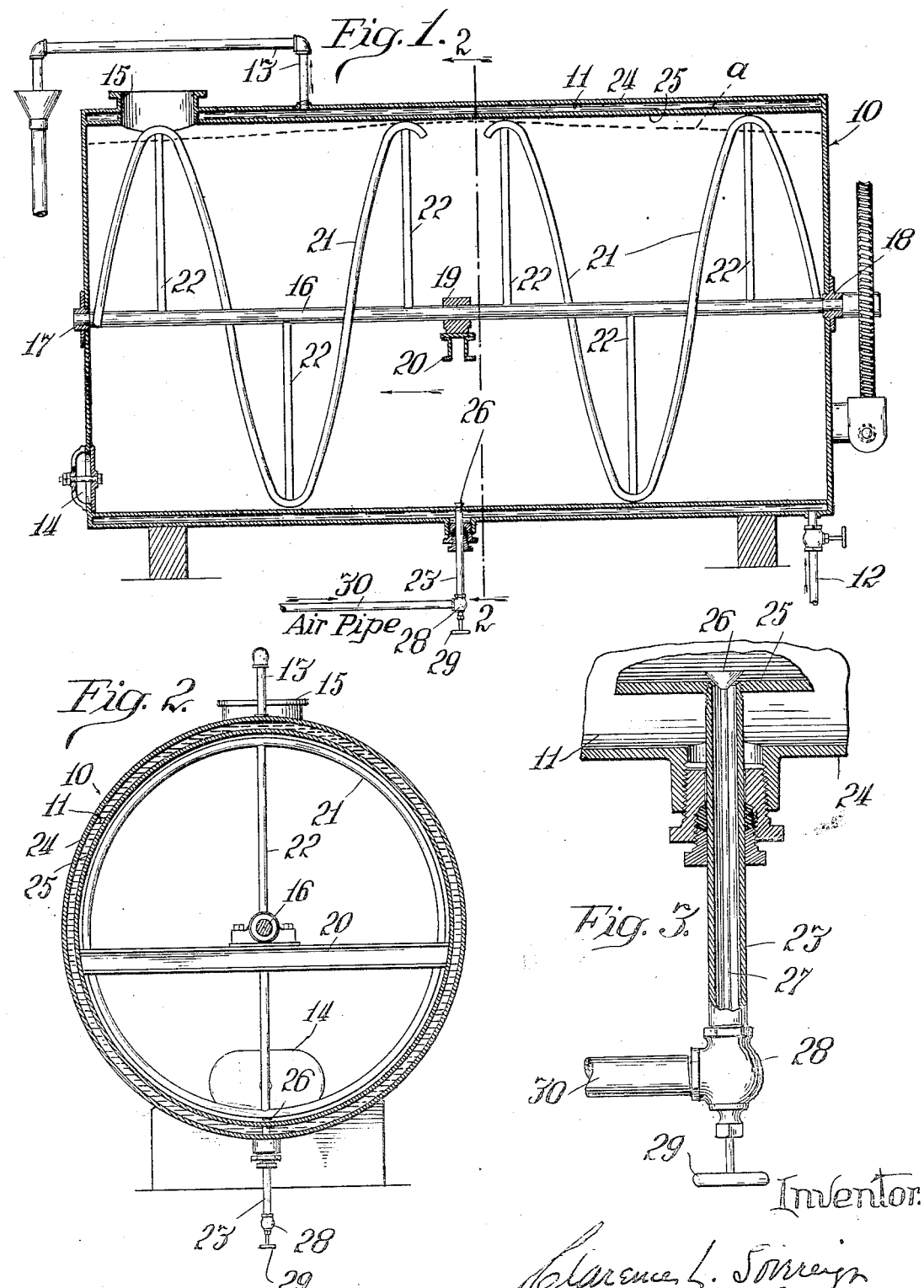

1,870,030

UNITED STATES PATENT OFFICE

CLARENCE L. SOVEREIGN, OF RIVERSIDE, ILLINOIS, ASSIGNOR TO INTERNATIONAL PATENTS DEVELOPMENT COMPANY, OF WILMINGTON, DELAWARE, A CORPORATION OF DELAWARE

METHOD OF CRYSTALLIZING

Application filed July 13, 1928. Serial No. 292,410.

This invention relates to crystallizing operations and particularly to the crystallization of dextrose from its solution, in the manufacture, for example, of a high purity crystalline dextrose or grape sugar from starch; and the primary object of the invention is to shorten the crystallization period and thereby reduce the cost of manufacture of the product. The improvement is based on the discovery that the time required for crystallizing the dextrose may be very considerably diminished if the solution and its solid phase dextrose employed as seed are given a somewhat violent agitation at an early stage of the crystallizing operation, instead of the slow mixing movement which it has been customary to impart to the mass at this stage and throughout the crystallizing period. This active agitation of the massecuite during the early part of the crystallizing operation makes it possible to give the dextrose solution a higher supersaturation, for example by cooling the converted liquor to a lower temperature than heretofore, without inducing the formation of "false grain", by which is intended small and malformed crystals, the presence of which in any large quantities tends to interfere with proper purging of the massecuite. Because of the higher supersaturation crystallization proceeds more rapidly.

The accompanying drawing illustrates a crystallizer of ordinary construction except as modified to adopt it for the purposes of the present invention. In the drawing:

Fig. 1 is a longitudinal sectional view of the crystallizer.

Fig. 2 is a cross sectional view on line 2—2 of Fig. 1; and

Fig. 3 is a sectional detail, with the scale enlarged, of the air inlet and valve.

In the manufacture of crystalline dextrose from starch in accordance for example with the method of U. S. Patent No. 1,471,347 granted October 23, 1923, to W. B. Newkirk, as modified by the improvement of U. S. Patent No. 1,521,830 granted January 6, 1925 to the same inventor, the starch is converted in water and in the presence of a hydrolyzing acid to produce a dextrose solution, and this liquid after being filtered and purified, and preferably after cooling to approximately 120° to 130° F. is run into the crystallizer into contact with a relatively large quantity of previously formed dextrose crystals (large that is in respect to the quantities of seed formerly used) and the mixture of the solution and previously formed crystals is given a slow movement, as for example by a helical propeller revolved at low velocity, which movement is maintained uniformly throughout the crystallizing operation. It has been customary to use as seeds "foots", that is a mixture of crystals and mother liquor, taken from a previous crystallizing operation. A batch for crystallization may consist of 73,000 pounds of fresh liquor having a density of 39.5° Baumé (calculated at 100° F.) and a purity of approximately 90% dextrose (dry substance basis), and 27000 pounds of foots, the latter containing from four to six parts out of ten of crystals and the balance mother liquor. The crystallizing operation is exothermic and the crystallizer is provided with a water jacket through which water may be circulated to maintain the massecuite, at the proper temperature for the manufacture of the type of dextrose desired, hydrate dextrose being more commonly made in accordance with this method than anhydrous dextrose. As the crystallization proceeds building up an increasing body of solid phase sugar, the temperature may be reduced so as to hasten crystallization, as set forth in the last named patent. The massecuite is then purged of its mother liquor in a centrifugal machine, for example, and the sugar washed with water while the sugar is in the machine. This sugar is known as "first sugar". The crystallizing operation requires on the average 120 hours. It has been customary, as described in the patents referred to, to take the mother liquor extracted from the first sugar and subject it after suitable treatment to further crystallizing and purging operations for the production of a "second sugar". This crystallization from the mother liquor may require 240 hours. The operation is otherwise substantially the same as the first crystallizing operation.

According to the present invention the converted liquor or mother liquor, as the case may be, is introduced into the crystallizer preferably at an initial temperature, considerably lower than that which has been customary and, to counteract the tendency of the solution in this state to throw off false grain, the mixture of solution and seed is given for some time a very active agitation.

Referring now to the drawing, 10 designates a crystallizer provided with a water jacket 11 having a water inlet pipe 12 and an outlet pipe 13. The crystallizer is formed with a valved opening 14 in the bottom for discharging the massecuite and preferably with a manhole 15 in the top. Extending longitudinally and centrally through the crystallizing chamber is a shaft 16 which turns in bearings 17, 18 in the end walls of the crystallizer and in a centrally disposed bearing 19 carried on a cross beam 20. Secured to shaft 16 are two helical ribbon propellers 21, 21 which work close to the interior surface of the crystallizer, the inner ends of these propellers being spaced apart so as not to come into contact with beam 20 when the shaft is revolved. The propellers 21, 21 may be strutted to shaft 16 by radial struts 22. The propelling device or mixer thus formed is revolved in a direction to produce a slow mixing movement of the body of liquid and crystals which gives the mass a trend toward the end of the crystallizer provided with the discharge opening. The crystallizer as so far described is of common construction. In the production of dextrose, it has been customary to rotate the propeller at the rate of one revolution in three minutes. Assuming a batch of 100,000 pounds and a crystallizer 18½ feet long and 10 feet in diameter the massecuite will come to within about five inches of the top of the crystallizer. The purpose of giving this movement to the massecuite is to continuously bring fresh solution into contact with the growing crystals. The movement has been slow to allow the crystals to grow to the required size. Rapid agitation throughout the crystallizing operation will give a product consisting of very minute crystals.

It has been found, however, that the massecuite, consisting either of converter liquor or mother liquor from the centrifugals and seed, can be subjected, at an early stage of the operation, to quite an active agitation without detriment to the product and with a very material shortening of the crystallizing operation. Preferably this agitation is accomplished by the injection of air under pressure into the bottom of the crystallizer while the propeller is revolving. For this purpose the crystallizer is provided with centrally arranged air inlet nozzle 23 extending through the outer and inner walls 24, 25 of the crystallizer, the inner end of which is closed by a conical valve 26 having a stem 27 threaded in a fitting 28 and provided with a hand wheel 29. Air is admitted to the fitting 28 and nozzle 23 through pipe 30. This valve arrangement is to prevent the massecuite from clogging the nozzle.

The air pressure should be sufficient to overcome the weight of the material so that the center part of the mass is lifted as indicated by the dotted line $a$ in Fig. 1, the air rising in bubbles and escaping from the mass at the top and passing out from the crystallizer through the manhole 15. For example, an air pressure in pipe 30 of 25 to 30 pounds will be sufficient for a batch of the size indicated. About 1500 cubic feet of free air is ordinarily used on each batch. When the massecuite is given a somewhat violent agitation during the first part of the crystallizing operation, as just described, it is possible to lower the initial temperature of the liquor introduced into the crystallizer, thereby increasing the supersaturation, without the danger of formation of false grain which would be likely to occur under the former practice at such low temperatures. For example, the solution before going to the crystallizer may be cooled to 110° F. assuming that the foots, in the proportion noted, are at about 90° F. or even lower. If the foots are warmer than 90° F. or the quantity greater than the proportion named, 27,000 pounds of foots to 73,000 pounds of fresh liquor, the temperature of the liquor may be still further reduced, proportionately. The preferred temperature of 110° F. is also based upon the stated density of 39.5° Baumé. With a lighter liquor the cooling can be carried further; with a more dense liquor preferably not so far. The increased supersaturation shortens the process of crystallization. The more rapid mixing of liquor and seed crystals tends to have the same effect.

Mechanical difficulties make it undesirable, although perhaps not impossible, to rotate the propeller during the first part of the period of crystallization at a sufficiently high speed to accomplish the result desired, at least to some extent. However, the agitation by compressed air is a cheap and a very efficient expedient and is the preferred method. Ordinarily under the conditions described, the air will be introduced into the crystallizer for about 30 to 45 minutes and is then shut off with the mixture at about 104° F. for example, and the revolution of the propeller continued at the velocity which has been heretofore customary. By this simple expedient the crystallizing period or "curing time" may be diminished for a first sugar from 120 hours to 80 hours which means that instead of using seventy-five crystallizers, fifty will suffice for the same output. The curing time for second sugars may be reduced from 240 hours to 150 hours. These figures should, of course, be regarded only as approximate. Varying conditions in different plants as well as variations in the quality and character of the product desired may be factors in determining the extent of the saving which can be effected in this way. It is certain, however, that under any ordinary and average conditions the shortening of the crystallizing period with consequent decrease in the initial cost and maintenance, operating cost of crystallizer equipment, and restriction of floor space, etc., will be very considerable.

While my invention has been described in a preferred embodiment, modifications are recognized as possible and it is therefore intended to cover by patent all equivalent methods and apparatuses within the scope of the appended claims. The relatively violent agitation of the mass produced by the introduction of compressed air has been described as taking place during the first part of the crystallizing period. This is on the assumption that the "crystallizing period" begins when the liquid is first brought into contact with the seed crystals whether in the crystallizer or before.

The amount of seed crystals, as dry seed or foots, may be considerably varied. Preferably, however, the foots are used in quantities from 20% to 40% of the batch, this giving a percentage of 10% to 20% of seed crystals in the batch. In any case where the solid phase dextrose is used in quantities to make it a significant factor in controlling the process of crystallization, that is when the quantity of the solid phase is such that the solid phase materially influences the character of the crystals formed, which is what is intended by the term "significant factor in controlling crystallization", it will be possible to use the present improvement and obtain a shortening of the crystallizing period. The employment of the initial agitation will also permit the use of a smaller amount of foots, or solid phase dextrose in other forms, as seed, with proportionate increase in the length of the crystallization period, or reduction in the size of the crystals. The term "starch converted dextrose solution" includes mother liquors and remelts as well as original converter liquors, together with any mixtures of these liquids.

I claim:

1. Method of producing crystalline dextrose from a starch converted solution which comprises bringing the solution in a state of supersaturation into contact with solid phase dextrose and subjecting the liquid and solid substances first to a relatively active agitation to rapidly disperse the solid phase throughout the solution and then to a quieter movement sufficient to maintain the solids in such dispersement and permit the growth of the crystals.

2. Method of producing crystalline dextrose from a starch converted solution which comprises bringing the solution in a state of supersaturation into contact with solid phase dextrose in quantity sufficient to be a significant factor in controlling crystallization and subjecting the liquid and solid substances first to a relatively active agitation to disperse the solid phase throughout the solution and then to a less active movement sufficient to maintain the solids in such dispersement and permit the growth of the crystals.

3. Method of producing crystalline dextrose from a starch converted dextrose solution which comprises bringing the solution cooled to approximately 110° Fahrenheit into contact with solid phase dextrose and subjecting the liquid and solid substances first to a relatively active agitation to rapidly disperse the solid phase throughout the solution and then to a less active movement sufficient to maintain the solids in such dispersement and permit the growth of the crystals.

4. Method of producing crystalline dextrose from a starch converted solution which comprises bringing the solution into contact with solid phase dextrose in quantity from 10% to 20% of the batch and subjecting the liquid and solid substances first to a relatively active agitation to disperse the solid phase throughout the solution and then to a less active movement sufficient to maintain the solids in such dispersement and permit the growth of the crystals.

5. Method of producing the crystallization of dextrose from a starch converted solution which comprises first mixing the solution with foots from a previously produced massecuite by relatively rapid agitation and then continuing the movement in the mixture at a slower rate during the remainder of the crystallizing operation.

6. Method of producing the crystallization of dextrose from a starch converted solution which comprises first mixing the solution, at a temperature of approximately 110° Fahrenheit, with foots from a previously produced massecuite by relatively rapid agitation, and then continuing the movement at a slower rate during the remainder of the crystallizing operation.

7. Method of producing the crystallization of dextrose from a starch converted dextrose solution which comprises first mixing the solution with foots from a previously produced massecuite to give a batch of which the foots form from 20% to 40% by a relatively rapid agitation of the materials and then continuing the movement in the mixture at a slower rate.

8. Method of producing the crystallization of dextrose from a starch converted dextrose solution which comprises introducing the solution into a crystallizer containing foots from a previous massecuite, mixing the foots into the solution by a relatively rapid agitation and then continuing the movement in the mixture at a slower rate.

9. Method of producing crystallization of the dextrose in a starch converted dextrose solution which comprises introducing the solution into a crystallizer upon a mass of already formed dextrose crystals, introducing air into the lower part of the crystallizer to effect a rapid agitation and dispersion of the crystals through the solution during the first part of the crystallizing operation and subjecting the mixture to a slower movement during the remainder of the crystallizing period.

10. In the crystallization of dextrose from a starch converted dextrose solution involving agitating the mass sufficiently to bring about dispersion of the solid phase throughout the solution and permit growth of purgible crystals, the improvement which consists in giving the mass a more active agitation during the first part of the crystallizing operation than during the remainder thereof to hasten the dispersion of the solid phase.

11. In the crystallization of dextrose from a starch converted dextrose solution in which the mass is mechanically stirred during the crystallizing operation sufficiently to bring about dispersion of the solid phase throughout the solution and permit growth of purgible crystals, the improvement which consists in increasing the agitation during the first part of the crystallizing operation by forcing air under pressure through the mass to hasten the dispersion of the solid phase.

12. In the crystallization of dextrose from a starch converted dextrose solution in which a mixture of solution and foots is mechanically agitated during the crystallizing operation sufficiently to bring about dispersion of the crystals throughout the solution and permit growth of purgible crystals, the improvement which consists in increasing the agitation during the first part of the crystallizing operation by forcing air under pressure through the mass to hasten the dispersion of the solid phase.

13. Method of crystallizing dextrose from a starch converted dextrose solution of which comprises: mechanically agitating a batch consisting of 73,000 pounds of solution at an initial temperature of 110° F. and density of 39.5° Baumé (calculated at 110° F.), and 27,000 pounds of foots containing from 40% to 60% solid phase; and forcing air under pressure through the mass for about the first 30 to 45 minutes of the crystallizing operation.

CLARENCE L. SOVEREIGN.